United States Patent [19]

Spring et al.

[11] Patent Number: 5,776,317
[45] Date of Patent: Jul. 7, 1998

[54] EXTRACTOR FOR SOXHLET SOLID-LIQUID EXTRACTION

[75] Inventors: Arthur Spring; Stefan Hungerbühler, both of Flawil; Marco Sanwald, Grub; Erwin Bossart, Flawil, all of Switzerland

[73] Assignee: Buchi Labortechnik AG, Flawil, Switzerland

[21] Appl. No.: 660,401

[22] Filed: Jun. 7, 1996

[30] Foreign Application Priority Data

Jun. 8, 1995 [EP] European Pat. Off. ............ 95810380

[51] Int. Cl.⁶ ............ B01D 3/00; B01D 11/00; C10B 27/00
[52] U.S. Cl. ............ 202/168; 202/169; 202/254
[58] Field of Search ............ 202/168, 169, 202/254

[56] References Cited

U.S. PATENT DOCUMENTS

| 2,095,056 | 10/1937 | Clough | 202/168 |
| 5,017,500 | 5/1991 | Langer | 436/178 |

FOREIGN PATENT DOCUMENTS 2 570 956   4/1986   France .

*Primary Examiner*—Patrick D. Niland
*Attorney, Agent, or Firm*—Shoemaker and Mattare, Ltd.

[57] ABSTRACT

Extractor (21) has extraction vessel (24) to which reflux line (26) is molded in one piece. Valve (1) which can be opened to allow the extract to flow back from extraction vessel (24) into distillation vessel (22) is sealed into reflux line (26). Valve (1) can be triggered depending on the height of the solvent level in extraction vessel (24).

16 Claims, 4 Drawing Sheets

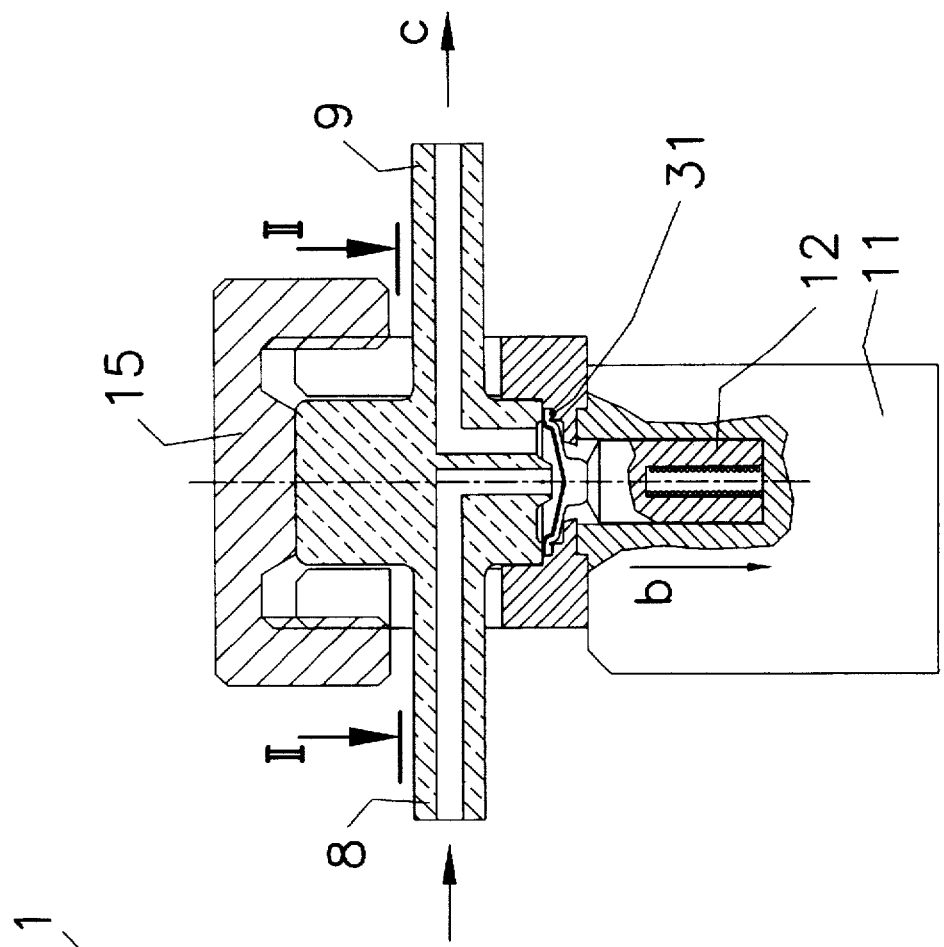
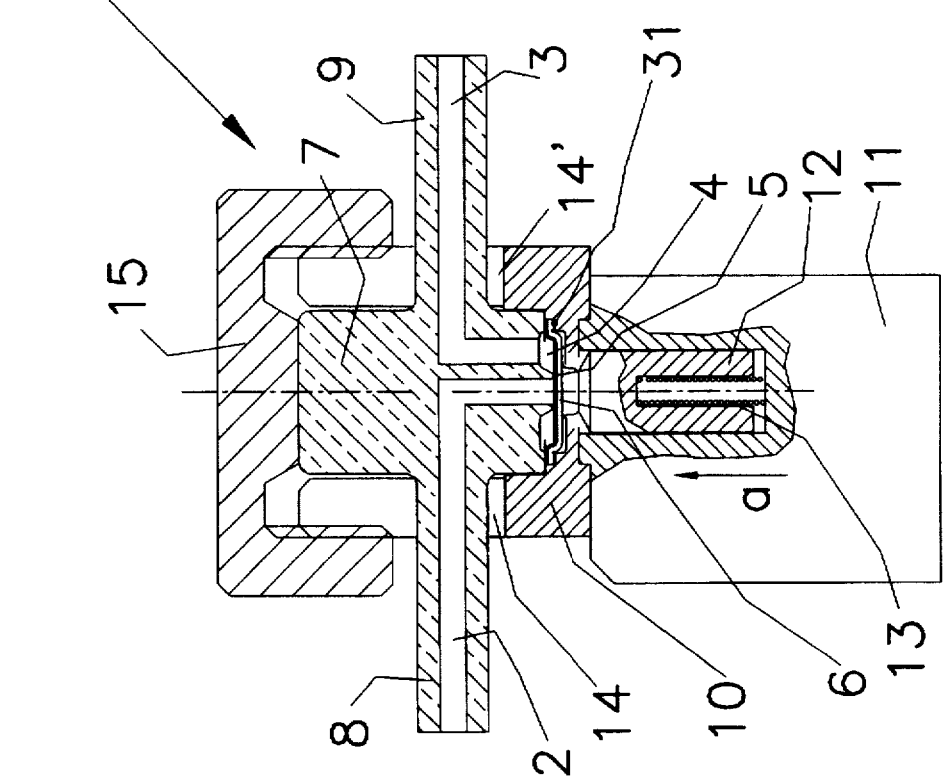

EXTRACTOR FOR SOXHLET SOLID-LIQUID EXTRACTION

The invention relates to a Soxhlet extractor for solid-liquid extraction.

In known Soxhlet solid-liquid extractors a solvent is vaporized in a heatable distillation vessel and routed via a steam line into an extraction vessel located above the distillation vessel. The extraction vessel is provided to hold the material to be extracted and the extract and is made with a cooler for condensing the extractant or solvent.

To return the extract from the extraction vessel to the distillation vessel when a certain level of the extractant is reached in the extraction vessel there is a reflux line. Soxhlet extractors according to German Institute for Standards 12602 have a so-called siphon means which returns the extract to the distillation vessel when the solvent level which is always the same is reached. In doing so however control of the extract return is not possible. The prerequisite for operation of this extractor is therefore the use of always the same amount of solvent. In the course of the environmentalism which is becoming more and more widespread and also in medicine and the laboratory it would be desirable to devise extractors in which the amount of solvent used could be set individually by the user.

The object of the invention is to devise an extractor of the initially mentioned type with individual control of the extract return, in which different amounts of solvent can be used for distillation. In this case it should be possible to easily clean the extractor arrangement and prepare an inert system.

This object is achieved according to the invention with an extractor which has the features in claim 1.

In the bottom area a reflux line which is routed with a gradient over its entire length and which has a free end which discharges into the distillation vessel is attached to the extraction vessel.

The reflux line can be opened and closed by means of a valve. If the solvent level has reached the desired height, the valve can be opened and the extract discharged into the distillation vessel. The valve enables control of the extraction process according to various parameters. The gradient ensures that all the extract is removed each time.

The closing element is advantageously activated via electromagnetic means which are attached to the housing. But also pneumatic, hydraulic or mechanical control devices are conceivable and in certain cases the closing element could also be manually activated.

In one preferred embodiment the extraction vessel and the reflux line are made as a one-piece glass set and the valve has connecting branches with which it is sealed directly into the reflux line.

This arrangement is especially suited for use in the laboratory where extractors must be periodically cleaned or sterilized.

A valve with at least one drain line and at least one feed line which are connected to a valve chamber in which there is at least one valve face is especially advantageous.

The valve has a closing element which interacts with the valve face to form a seal and which can be activated from the outside of the valve chamber.

Depending on the material for the housing or for the closing element the valve thus becomes inert relative to the medium flowing through it.

Use of a valve with a valve chamber which is partially bounded by a homogenous glass valve body is especially advantageous, on which a valve face is made in one piece which has one branch each for the feed line and for the drain line. The valve body is thus detachably held in a housing which surrounds the remaining valve chamber.

If the closing element has a membrane with an edge area which is clamped securely to form a seal between the valve body and the housing, hermetic separation between the feed line and drain line is achieved. Besides the glass valve body the membrane is the sole component which in the valve chamber is exposed to the medium flowing through it. The membrane can consist continuously of an elastic material, but it can also be made relatively rigid especially in the edge area.

One especially advantageous design arises when the valve body is made roughly cylindrical and the housing is made roughly pot-shaped and has lateral slots through which the branches emerge from the housing, in which the valve body can be fixed in position with a sealing cap which can be placed on the housing. The valve body is thus used at the same time as a holder for the housing to which another control device is optionally attached. When a membrane is used the valve face can be made as a conical orifice on one end of the valve body. The membrane thus rests on the orifice cone on a relatively small circular ring surface, with which a high surface pressure is achieved. Of course, the valve face can also have other shapes, especially when a sphere or cone is used as the closing element.

If the conical orifice is surrounded by a peripheral groove into which a hole for the drain line discharges, the membrane is prevented from abutting the opening for the drain line. On the other hand, when the membrane is raised the flow cross section is always sufficient so that the valve chamber does not act as a choke.

It is especially advantageous to use means which are located on the extraction vessel and which are used to ascertain the liquid level. As soon as the liquid level reaches a certain height, the means emit a signal with which the valve can be opened. After a predetermined time or when the extraction vessel is emptied, the valve is closed again.

In one especially optimum embodiment, outside of the extraction vessel there is a riser which communicates with the extraction vessel. In this way, in the riser a column is formed which always has the same height as the liquid in the extraction vessel. The means for measuring the solvent level can therefore also be attached to this riser. To set the different liquid levels the means can be movably located on the riser.

Especially a photoelectric barrier arrangement is suitable as the means. Here a light-emitting sender element is located on one side of the riser and a light detector element opposite on the other side of the riser. As soon as the liquid level in the riser has reached the height to which the photoelectric barrier arrangement is attached, the intensity of the light detected by the detector element changes and the photoelectric barrier arrangement emits a signal to open the valve. However, a float arrangement or inductive measurement is also conceivable as the means.

One especially advantageous construction of the extraction vessel arises when the riser on its lower end discharges directly and above the valve into the reflux line. This arrangement above all else has the advantage that for the riser and for the reflux line only one common output from the extraction vessel need be provided.

To execute hot extraction the extraction vessel can also have a separate heating means.

In one preferred embodiment, on the extraction vessel and/or on the distillation vessel there is a temperature sensor. The valve can be triggered via the ascertained temperature. This should result in the fact that the valve is only opened when a certain temperature of the material to be extracted is reached.

In one preferred embodiment the distillation vessel has an inert gas connection. By adding inert gas the extractor arrangement can be easily dried, blocking of the valve being selectively possible.

One embodiment of the invention is shown in the drawings and is detailed below.

FIG. 3 shows a cross section through a lift armature solenoid valve in the closed state, FIG. 4 shows the valve according to FIG. 3 in the opened state.

Figure 1:
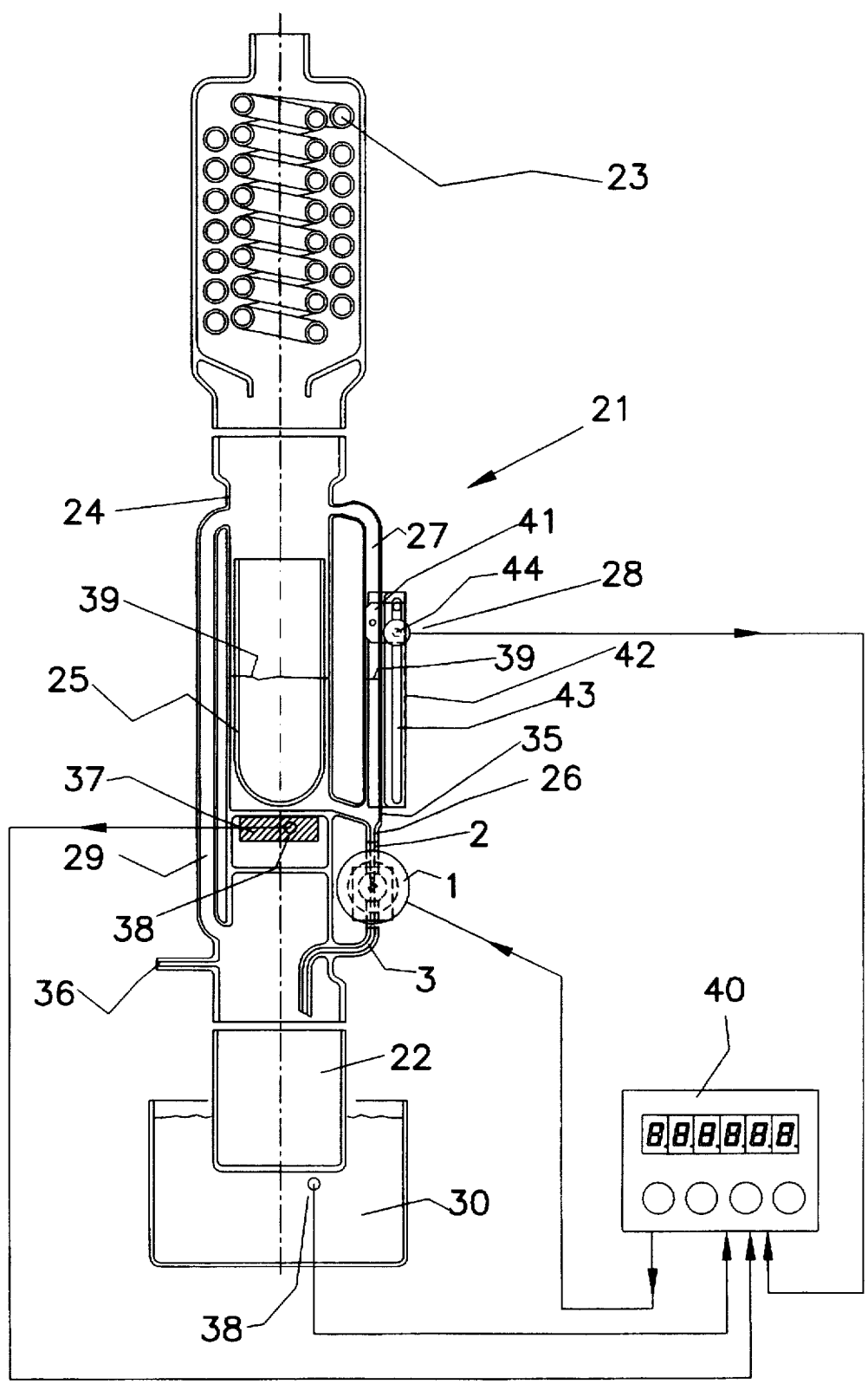
FIG. 1 shows a Soxhlet extractor according to the invention with a valve integrated into the reflux line.

FIG. 1 shows extractor 21 with reflux line 26 which is provided with valve 1. Extractor 21 has distillation vessel 22 in which an extractant can be heated to boiling using heating means 30. The extractant rises as steam through steam pipe 29, is condensed on cooler 23, and drips into extraction vessel 24. The material to be extracted is placed in extraction thimble 25 with a permeable bottom. From the bottom end of extraction vessel 24 reflux line 26 leads back to distillation vessel 22. Reflux line 26 is routed over its entire length with a gradient and with its free end discharges in distillation vessel 22.

Parallel to extraction vessel 24 there runs riser 27 in which the same liquid level prevails as in extraction vessel 24. On riser 27 there are permanent or adjustable means 28 for ascertaining the liquid level in the form of a photoelectric barrier. The photoelectric barrier arrangement 32 consists of sender element 33 and detector element 34 (FIG. 2) which are arranged oppositely on top of one another on riser 27.

Photoelectric barrier arrangement 32 is movably attached by retaining device 41 to guide rail 42 which is located parallel to riser 27.

Guide rail 42 is made rectangular and is provided with slot 43 which runs from bottom to top.

In retaining device 41 an opening is recessed into which guide rail 42 can be inserted. By means of set screw 44 retaining device 41 can be fixed at a certain height.

As soon as the liquid level 39 in riser 27 has reached the height of photoelectric barrier arrangement 32, the light intensity which is measured by detector element 34 decreases. Thus photoelectric barrier arrangement 32 sends a signal to control device 40 which for its part emits a signal to open valve 1. In this way extraction vessel 24 is emptied as soon as the solvent level has reached a setpoint determined by the user. Thus even small amounts of solvent can be used without the need to reach the fixed removal level given by the siphon means.

To execute hot extraction, extraction vessel 24 in its lower part has separate heating means 37. With it the material to be extracted can be heated to the desired temperature, by which the intensity of the extraction process is increased. Temperature sensor 38 determines the temperature of separate heating means 37 in the lower area of the extraction vessel and emits a signal to control device 40. Control device 40 can be programmed such that the valve is only opened when, in addition to the setpoint of liquid level 39, a desired temperature of the separate heating means 37 is also reached. Another parameter for valve control arises when temperature sensor 38 is used to measure the temperature of heating means 30 of distillation vessel 22.

In cold extraction, control device 40 can be programmed such that the temperatures measured by temperature sensors 38 for controlling valve 1 are not considered.

Extraction vessel 24, riser 27 and reflux line 26 are made of glass in one piece. Here riser 27 is attached by its lower end 35 on the top of reflux line 26.

To dry out the extractor arrangement, there is inert gas connection 36 which is molded onto distillation vessel 22. By means of inert gas connection 36 the entire arrangement can be filled with gas, closed valve 1 preventing reflux of the solvent into distillation vessel 22.

By hermetically sealing extraction vessel 24 on its upper end, extraction can be done under a vacuum or partial vacuum. In this way extraction with lower temperatures is possible.

Figure 2:
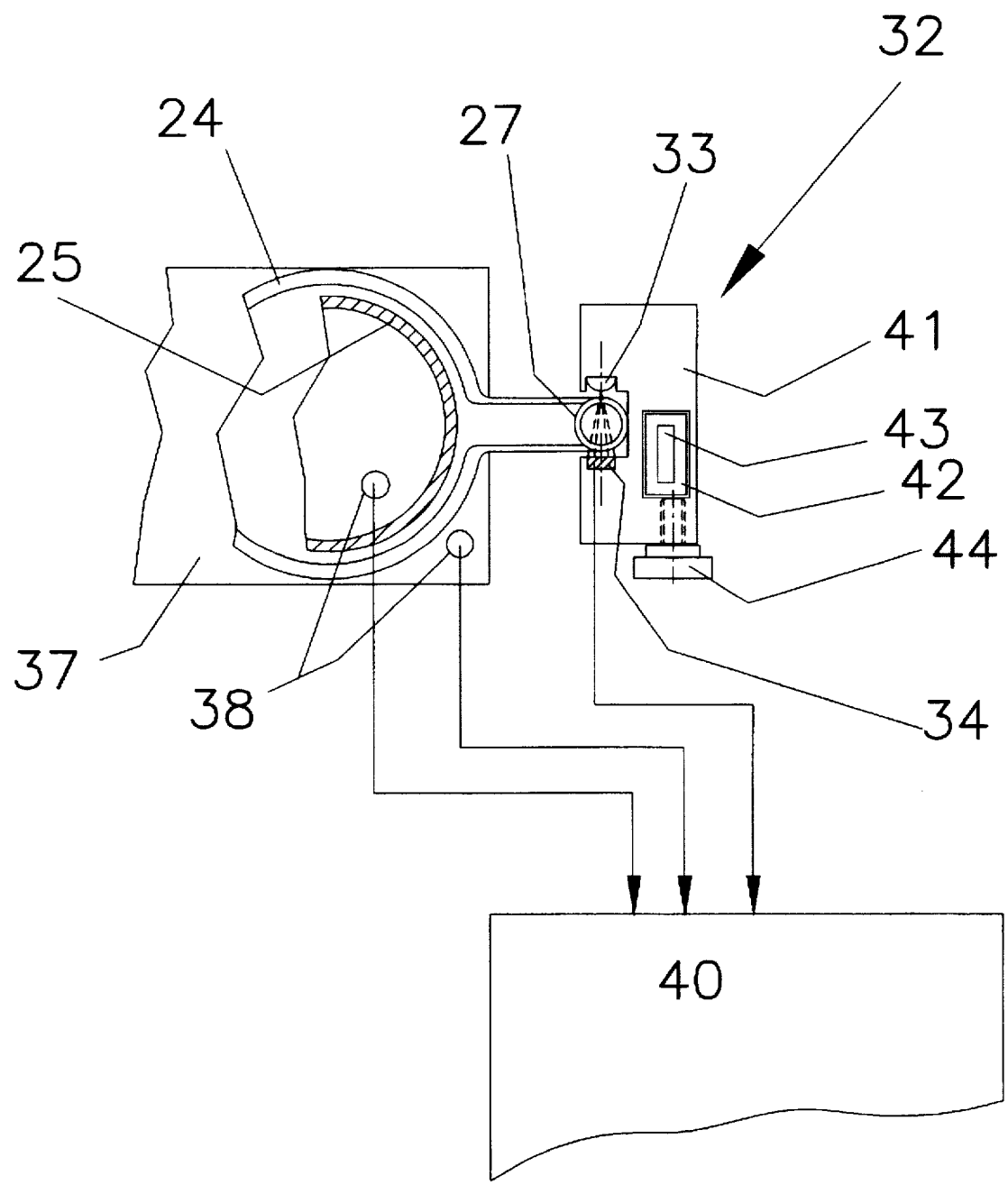
FIG. 2 shows an overhead view of the means on the riser pipe according to FIG. 1.

FIG. 2 shows an overhead view of extractor 21 according to FIG. 1 in which the glass set is only indicated. Riser 27 is molded in one piece to extraction vessel 24. By means of retaining device 41 photoelectric barrier arrangement 32 is arranged such that sender element 33 and detector element 34 are opposite one another and are separated from one another by riser 27. Retaining device 41 is movably attached using set screw 44 to guide rail 42 which is located parallel to riser 27. Distillation vessel 22 is located above heating means 30. Another separate heating means 37 is located between the top end of distillation vessel 22 and extraction vessel 24. Temperature sensors 38 measure the temperatures of two heating means 30 and 37. The signals emerging from detector element 34 of photoelectric barrier arrangement 32 and from temperature sensors 38 are evaluated by control device 40 for control of valve 1.

FIG. 3 shows a cross section through lift armature solenoid valve 1 which is used to open and close reflux line 26. Valve 1 consists essentially of homogenous valve body 7 of glass, for example, borosilicate glass. Valve body 7 is made roughly cylindrical and integral with branches 8 and 9 for feed line 2 or for drain line 3.

Figure 5:
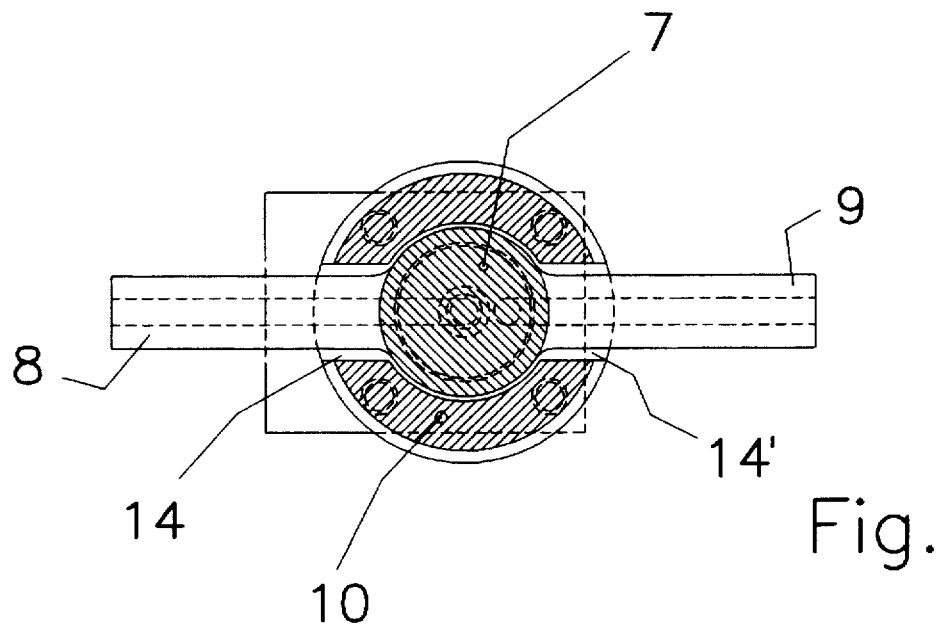
FIG. 5 shows a section through plane I—I according to FIG. 4.
Figure 6:
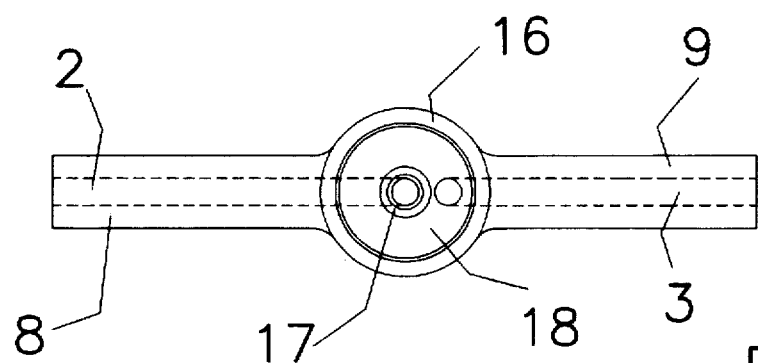
FIG. 6 shows an overhead view of the valve body.
Figure 7:
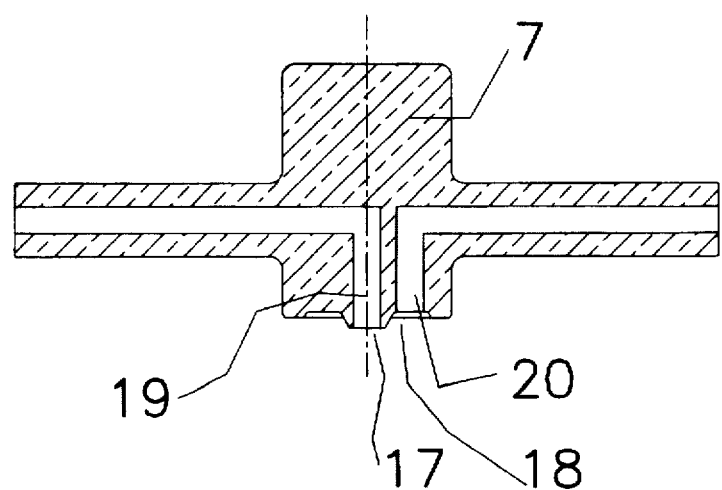
FIG. 7 shows a cross section through the valve body according to FIG. 6.

On end 16 (FIG. 6) conical orifice 17 is molded which is surrounded by peripheral groove 18. Orifice 17 at the same time forms valve face 5 (FIG. 3) and it is the end of central hole 19 for the feed line. From peripheral groove 18 drainage takes place through hole 20. Valve body 17 is held in pot-shaped housing 10 which has slots 14, 14' for penetration of branches 8 and 9 (FIG. 5). In the upper area the housing has an external thread onto which sealing cap 15 with an internal thread can be screwed. Sealing cap 15 presses valve body 7 against bottom 31 in housing 10. Instead of a screw connection, sealing cap 15 could also be made as a quarter-turn fastener, toggle catch, or the like.

Valve body 7 and housing 20 together border valve chamber 4 in which membrane 6 of a preferably elastic material is held. The edge area of this membrane is clamped and serves at the same time as a seal against the outside.

On housing 10, there is electromagnetic control device 11 which carries a magnetic coil. Lifting armature 12 is joined to membrane 6 by a hole in bottom 31 and is prestressed by means of compression spring 13 in arrow direction a against the valve face. For a dead coil the membrane is thus pressed against the valve face and the valve is closed.

FIG. 4 shows the valve in the opened position. The energized coil draws lifting armature 12 back against the force of compression spring 13 in arrow direction b, membrane 6 being lifted from valve face 5. Via valve chamber 4 feed line 2 is shorted with drain line 3 and flow takes place in arrow direction c. Two branches 8 and 9 are preferably melted directly into reflux line 26.

We claim:

1. Soxhlet extractor (21) for solid-liquid extraction with heatable distillation vessel (22), extraction vessel (24) located above the latter to hold the material to be extracted and the extract, and with cooler (23) for condensing the extractant, to periodically return the extract from extraction vessel (24) to distillation vessel (22) when predetermined level (39) is reached reflux line (26) being provided, which proceeds from the bottom area of extraction vessel (24) and discharges into distillation vessel (22), characterized in that reflux line (26) is routed with a gradient over its entire length from extraction vessel (24) to distillation vessel (22) and that it has valve (1) for opening and closing reflux line (26).

2. Extractor according to claim 1, wherein valve (1) is a solenoid valve.

3. Extractor according to claim 1, in which extraction vessel (24) and reflux line (26) are made as a one-piece glass set, wherein valve (1) has connecting branches (8, 9) which are directly sealed into reflux line (26).

4. Extractor according to claim 1, wherein valve (1) has at least one feed line (2) and at least one drain line (3) which are connected to valve chamber (4), in which at least one valve face (5) is located, wherein the valve has at least one closing element (6) which interacts with the valve face to form a seal and which can be activated from the outside of valve chamber (4), wherein valve chamber (4) is partially bounded by homogenous glass valve body (7), on which valve face (5) is made in one piece and which has one branch (8, 9) each for feed line (2) and for drain line (3), and wherein valve body (7) is detachably held in housing (10) which surrounds the remaining valve chamber.

5. Extractor according to claim 4, wherein the closing element has membrane (6) with an edge area which is clamped securely to form a seal between valve body (7) and housing (10).

6. Extractor according to claim 4, wherein valve body (7) is made roughly cylindrical and wherein housing (10) is made roughly pot-shaped and has lateral slots (14, 14'), through which branches (8, 9) emerge from the housing, in which valve body (7) can be fixed in position with sealing cap (15) which can be placed on the housing.

7. Extractor according to claim 4, wherein valve face (5) is made as conical orifice (17) on one end (16) of valve body (7).

8. Extractor according to claim 7, wherein conical orifice (17) is surrounded by peripheral groove (18) into which hole (20) for drain line (3) discharges.

9. Extractor according to claim 1, wherein on extraction vessel (24) there are means (28) to ascertain liquid level (39) and wherein valve (1) can be activated via these means at a predetermined level.

10. Extractor according to claim 9, wherein outside of extraction vessel (24) there is riser (27) which communicates with the extraction vessel and wherein means (23) are located on the riser.

11. Extractor according to claim 10, wherein means (28) have photoelectric barrier arrangement (32) with sender element (33) and detector element (34) which are arranged on riser (27) such that the light beam penetrates riser (27).

12. Extractor according to claim 11, wherein photoelectric barrier arrangement (32) is located to be vertically adjustable on riser (27).

13. Extractor according to claim 10, wherein riser (27) on its lower end (35) discharges directly and above valve (1) into reflux line (26).

14. Extractor according to claim 1, wherein distillation vessel (22) has inert gas connection (36).

15. Extractor according to claim 1, wherein extraction vessel (24) has separate heating means (37).

16. Extractor according to claim 1, wherein on extraction vessel (24) and/or on distillation vessel (22) there is temperature sensor (38) and wherein valve (1) can be triggered via the ascertained temperature.

* * * * *